US012213051B1

(12) United States Patent
Xie et al.

(10) Patent No.: US 12,213,051 B1
(45) Date of Patent: Jan. 28, 2025

(54) ROUTE DISCOVERY METHOD AND APPARATUS, DEVICE, AND STORAGE MEDIUM

(71) Applicant: SHENZHEN HEIMAN TECHNOLOGY CO., LTD, Shenzhen (CN)

(72) Inventors: Bin Xie, Shenzhen (CN); Xiong Li, Shenzhen (CN)

(73) Assignee: SHENZHEN HEIMAN TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/893,825

(22) Filed: Sep. 23, 2024

(30) Foreign Application Priority Data

Feb. 1, 2024 (CN) .......................... 202410141459.7

(51) Int. Cl.
*H04W 40/24* (2009.01)
*H04W 40/02* (2009.01)
*H04W 40/34* (2009.01)

(52) U.S. Cl.
CPC ......... *H04W 40/246* (2013.01); *H04W 40/02* (2013.01); *H04W 40/34* (2013.01)

(58) Field of Classification Search
CPC .... H04W 40/246; H04W 40/02; H04W 40/34
See application file for complete search history.

(56) References Cited

U.S. PATENT DOCUMENTS

| | | | | |
|---|---|---|---|---|
| 2010/0074194 A1* | 3/2010 | Liu | ....................... | H04L 45/124 370/329 |
| 2013/0163514 A1* | 6/2013 | Ikemoto | .............. | H04W 40/248 370/328 |
| 2022/0015006 A1* | 1/2022 | Di Marco | ........... | H04W 40/246 |
| 2023/0224729 A1* | 7/2023 | Nakamura | ............ | H04W 24/10 370/329 |

FOREIGN PATENT DOCUMENTS

CN 104053205 A 9/2014

OTHER PUBLICATIONS

First Office Action issued in counterpart Chinese Patent Application No. 202410141459.7, dated Mar. 13, 2024.

* cited by examiner

*Primary Examiner* — Kevin M Cunningham
(74) *Attorney, Agent, or Firm* — Westbridge IP LLC (57) ABSTRACT

Disclosed are a route discovery method and apparatus, a device, and a storage medium. This method includes: receiving a route request packet that is broadcast to a current node; determining whether it is the first time that the current node receives the route request packet; if yes, evaluating, based on link overheads and retransmission overheads, performance of a real-time route and a historical route to obtain an evaluation result; and if the evaluation result indicates that the real-time route is better than the historical route, updating a reverse route of the current node based on the real-time route, to discover a route between a source node and a destination node based on the updated reverse route of the current node. Therefore, link overheads and retransmission (Continued)

overheads are considered in an AODV route discovery process, so that a discovered route has more balanced forward and reverse transmission performance.

5 Claims, 5 Drawing Sheets

ROUTE DISCOVERY METHOD AND APPARATUS, DEVICE, AND STORAGE MEDIUM

CROSS-REFERENCE TO RELATED APPLICATIONS

This application claims priority to Chinese Patent Application No. 202410141459.7, filed on Feb. 1, 2024, the content of which is incorporated herein by reference in its entirety.

TECHNICAL FIELD

This application relates to the field of communication technologies, and in particular, to a route discovery method and apparatus, a device, and a storage medium.

BACKGROUND

Currently, during AODV route discovery, a source node broadcasts a route request packet, an intermediate node forwards the route request packet to a destination node, and then the destination node transmits a route response packet back to the source node through an original path, so as to complete the route discovery process. However, during AODV route discovery, only the problem of route overhead is considered, but collection and determining of other performance indicators of a route and balance between performance of a forward route and performance of a reverse route are not considered. Consequently, the best route may not be obtained.

SUMMARY

An objective of this application is to provide a route discovery method and apparatus, a device, and a storage medium, to ensure that factors of link overheads and retransmission overheads are comprehensively considered in an AODV route discovery process, so that a discovered route has more balanced forward and reverse transmission performance.

An embodiment of this application provides a route discovery method, including:
  receiving a route request packet that is broadcast to a current node;
  determining whether it is the first time that the current node receives the route request packet;
  if it is not the first time that the current node receives the route request packet, evaluating, based on link overheads and retransmission overheads, performance of a real-time route and a historical route to obtain an evaluation result, where the real-time route is a route through which the route request packet is broadcast to the current node, the historical route is a route through which the route request packet is broadcast to the current node, and a priority of the route performance evaluation based on the link overheads is higher than a priority of the route performance evaluation based on the retransmission overheads; and
  if the evaluation result indicates that the real-time route is better than the historical route, updating a reverse route of the current node based on the real-time route, so as to discover a route between a source node and a destination node based on the updated reverse route of the current node.

In some embodiments, the evaluating, based on link overheads and retransmission overheads, performance of a real-time route and a historical route to obtain an evaluation result includes:
  comparing the link overheads of the real-time route and the link overheads of the historical route with a link overhead threshold;
  if both the link overheads of the real-time route and the link overheads of the historical route are less than the link overhead threshold, outputting an evaluation result indicating a better route in the real-time route and the historical route, that is, the route that has a smaller sum of link overheads;
  if only the link overheads of the real-time route are less than the link overhead threshold, outputting an evaluation result indicating that the real-time route is better than the historical route;
  if only the link overheads of the historical route are less than the link overhead threshold, outputting an evaluation result indicating that the historical route is better than the real-time route; and
  if neither the link overheads of the real-time route nor the link overheads of the historical route are less than the link overhead threshold, comparing a sum of retransmission overheads of the real-time route with a sum of retransmission overheads of the historical route, and outputting an evaluation result indicating a better route in the real-time route and the historical route, that is, the route that has a smaller sum of retransmission overheads.

In some embodiments, the comparing the link overheads of the real-time route and the link overheads of the historical route with a link overhead threshold further includes:
  performing fuzzing on a power loss of a link and transmitting and receiving performance parameters of the link according to a preset fuzzing rule to obtain the link overheads, and performing fuzzing on a retransmission probability value of the link to obtain the retransmission overheads.

In some embodiments, the route discovery method further includes:
  if it is the first time that the current node receives the route request packet, establishing a reverse route from the current node to the source node;
  determining whether the current node is the destination node; and
  if the current node is the destination node, buffering link overheads and retransmission overheads of each node on the reverse route, and sending, through unicast, a route response packet to the source node through the reverse route; or
  if the current node is not the destination node, buffering link overheads and retransmission overheads of each node on the reverse route, updating link overheads and retransmission overheads of the current node to the route request packet to obtain an updated route request packet, and broadcasting the updated route request packet.

In some embodiments, the establishing a reverse route from the current node to the source code includes:
  recording node information of a broadcast node, sending, through unicast, the route response packet to the broadcast node before preset duration expires, and deleting the node information of the broadcast node when the preset duration expires, where the broadcast node is a node that broadcasts the route request packet to the current node.

In some embodiments, after the updating link overheads and retransmission overheads of the current node to the route request packet to obtain an updated route request packet, and broadcasting the updated route request packet, the method further includes:

receiving the route response packet that is sent, through unicast, to the current node; and establishing a forward route from the current node to the destination node based on the route response packet received by the current node.

In some embodiments, the updating a reverse route of the current node based on the real-time route, so as to discover a route between a source node and a destination node based on the updated reverse route of the current node includes:

updating a routing table of the current node based on the real-time route;

updating the reverse route of the current node based on the routing table of the current node; and sending, through unicast, a route response packet of the destination node to a neighbor node of the current node through the reverse route of the current node, so that the route response packet is finally transmitted to the source node.

An embodiment of this application further provides a route discovery apparatus, including:

a first module, configured to receive a route request packet that is broadcast to a current node;

a second module, configured to determine whether it is the first time that the current node receives the route request packet;

a third module, configured to: if it is not the first time that the current node receives the route request packet, evaluate, based on link overheads and retransmission overheads, performance of a real-time route and a historical route to obtain an evaluation result, where the real-time route is a route through which the route request packet is broadcast to the current node, the historical route is a route through which the route request packet is broadcast to the current node, and a priority of the route performance evaluation based on the link overheads is higher than a priority of the route performance evaluation based on the retransmission overheads; and a fourth module, configured to: if the evaluation result indicates that the real-time route is better than the historical route, update a reverse route of the current node based on the real-time route, so as to discover a route between a source node and a destination node based on the updated reverse route of the current node.

An embodiment of this application further provides an electronic device, where the electronic device includes a memory and a processor, the memory stores a computer program, and when the processor executes the computer program, the foregoing route discovery method is implemented.

An embodiment of this application further provides a computer-readable storage medium, where the computer-readable storage medium stores a computer program, and when the computer program is executed by a processor, the foregoing route discovery method is implemented.

Beneficial effects of this application: when it is not the first time that the current node does not receive a route request packet from the source node to the destination node, the real-time route and historical route from the source node to the current node are evaluated from the two dimensions of link overheads and retransmission overheads to determine the best route from the source node to the current node so far, and then when the real-time route is better than the historical route according to the evaluation result, the reverse route of the current node is updated according to the real-time route until the route request packet is broadcast to the destination node. The destination node and each intermediate node previous to the destination node determine the best route from the source node to the current node so far, so that the performance of the link overhead and retransmission overhead on each link using the route from the source node to the destination node is more balanced, and the forward and reverse transmission performance is more balanced.

DETAILED DESCRIPTION OF THE EMBODIMENTS

To make the objectives, technical solutions, and advantages of this application more comprehensible, the following describes this application in detail with reference to embodiments and accompanying drawings. It should be understood that the specific embodiments described here are merely used to explain this application but are not intended to limit this application.

It should be noted that although functional modules are divided in a schematic diagram of an apparatus and a logical sequence is shown in a flowchart, in some cases, division of modules may be different from division of the modules in the apparatus, or steps shown or described can be performed in a different order than the order shown in the flowchart. In the specification, claims, and accompanying drawings, the terms "first", "second", and the like are intended to distinguish between similar objects but do not necessarily indicate a specific order or sequence.

Unless otherwise defined, all technical and scientific terms used in this specification have same meanings as those usually understood by a person skilled in the art of this application. The terms used in this specification are merely intended to describe embodiments of this application, and are not intended to limit this application.

Some terms used in this application are first explained.

Ad hoc On-Demand Distance Vector Routing (AODV) is a classic protocol for wireless ad hoc networks, and is a passive routing protocol. In AODV, a node in a network does not actively maintain routing information of the network, and when the node has a service transmission requirement, a source node will initiate a routing process if the source node does not find an effective route to a destination node in a routing table of the source node.

Routing is a process in which a network scope of a path is determined when a packet is transmitted from a source to a destination. Specifically, routing is a process in which a router receives a data packet from one interface, and directs and forwards the data packet to another interface based on a destination address of the data packet.

A link is a physical line or transmission medium that connects two devices or networks in a computer network, and the link is a channel through which data is transmitted in the network, which can transmit signals from one device to another device, so that the devices in the network can communicate and exchange data with each other.

In a conventional technology, during AODV route discovery, a source node broadcasts a route request packet, an intermediate node forwards the route request packet to a destination node, and then the destination node transmits a route response packet back to the source node through an original path, so as to complete the route discovery process. In other words, during AODV route discovery, only the problem of route overhead is considered, that is, when a plurality of routes to the same destination have the same route priority, the route with the least routing overheads will become the current best route, but collection and determining of other performance indicators of a route and balance between performance of a forward route and performance of a reverse route are not considered. Consequently, the best route may not be obtained.

In view of this, embodiments of this application provide a route discovery method and apparatus, a device, and a storage medium, to ensure that factors of link overheads and retransmission overheads are comprehensively considered in an AODV route discovery process, so that a discovered route has more balanced forward and reverse transmission performance.

Figure 1:
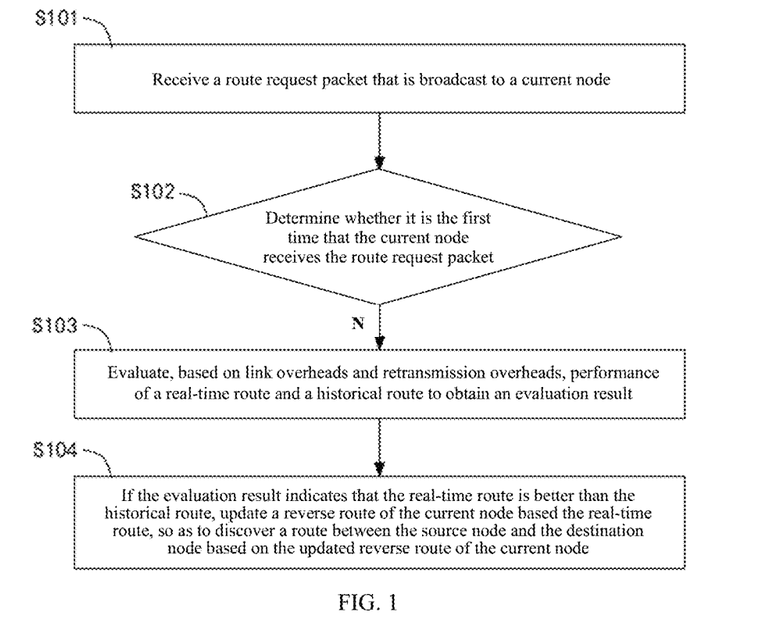
FIG. 1 is a first optional flowchart of a route discovery method according to an embodiment of this application.

Referring to FIG. 1, FIG. 1 is a first optional flowchart of a route discovery method according to an embodiment of this application. In some embodiments of this application, the method shown in FIG. 1 may specifically include, but is not limited to, step S101 to step S104. The following describes the four steps in detail with reference to FIG. 1.

Step S101: Receive a route request packet that is broadcast to a current node.

It may be understood that the current node may be an intermediate node or a destination node. During AODV route discovery, the source node broadcasts the route request packet, the intermediate node forwards the route request packet to the destination node, each node receives the route request packet broadcast by a neighbor node of the node, and broadcasts the route request packet to the neighbor node of the node after receiving the route request packet for the first time.

It may be understood that the route request packet includes a node address and a node sequence number of the source node and a node address and a node sequence number of the destination node; and after receiving the route request packet, the current node can determine whether the current node is the destination node based on the node address and the node sequence number of the destination node in the route request packet.

In step S101, when the neighbor node of the current node broadcasts the route request packet, neighbor nodes (including the current node) corresponding to the neighbor node receive the route request packet, and the current node receives the route request packet broadcast by the neighbor node of the current node. For example, if the current node is an intermediate node and has two neighbor nodes, and the two neighbor nodes of the current node are also neighbor nodes of the source node, the source node broadcasts the route request packet to the two neighbor nodes, and the two neighbor nodes receive the route request packet for the first time and broadcast the route request packet, so that the current node receives the route request packet broadcast by the two neighbor nodes.

Step S102: Determine whether it is the first time that the current node receives the route request packet.

It may be understood that when a route between the source node and the destination node is effective and communication is normal, the AODV routing protocol does not work; and only when the source node needs to send a data packet to the destination node but does not have a route entry of the destination node, and the destination node is not a neighbor node of the source node, a route request will be initiated, that is, a route request packet will be broadcast, each node will receive the route request packet broadcast by a neighbor node of the node, and the intermediate node and the destination node will receive the route request packet repeatedly. Therefore, it is needed to determine whether it is the first time that the current node receives the route request packet.

In step S102, the current node can determine, based on the node address and node sequence number of the source node and the node address and node sequence number of the destination node that are included in the route request packet, whether it is the first time that the current node receives the route request packet. If it is not the first time that the current node receives the route request packet, perform step S103.

Step S103: Evaluate, based on link overheads and retransmission overheads, performance of a real-time route and a historical route to obtain an evaluation result. The real-time route is a route through which the route request packet is broadcast to the current node, the historical route is a route through which the route request packet is broadcast to the current node, and a priority of the route performance evaluation based on the link overheads is higher than a priority of the route performance evaluation based on the retransmission overheads.

It may be understood that when the current node receives the route request packet, the current node can determine a reverse route between the current node and the source node based on a broadcast path of the received route request packet, and then determine, based on information about a node on the reverse route, a route through which the route request packet is broadcast to the current node. In other words, the real-time route is a route through which the most recently received route request packet is broadcast to the current node; and the historical route is a route through which a previously received route request packet is broadcast to the current node, and the historical route is the best route from the source node to the current node before the latest route request packet is received. For example, the current node has two neighbor nodes: a first neighbor node and a second neighbor node; both the first neighbor node and the second neighbor node receive and broadcast the route request packets broadcast by the source node; the current node first receives the route request packet broadcast by the first neighbor node, and obtains the reverse route of the current node, the first neighbor node, and the source node; and then the current node receives the route request packet broadcast by the second neighbor node, and obtains the reverse route of the current node, the second neighbor node, and the source node. In this case, the real-time route can be determined based on the reverse route of the current node, the second neighbor node, and the source node, and the historical route can be determined based on the reverse route of the current node, the first neighbor node, and the source node.

It may be understood that the link overhead is a comprehensive evaluation value of a power loss of a link and transmitting and receiving performance parameters of the link. The link overhead is used to evaluate data transmission and reception performance of the link. The power loss of the link is positively correlated with the link overhead. When other conditions are the same, the greater the power loss of the link, the lower the signal strength when the node receives data, and the higher the link overheads. The transmitting and receiving performance parameters of the link are negatively correlated with the link overhead. When other conditions are the same, the greater the transmitting and receiving performance parameters of the link, the higher the signal strength when the node receives data, and the lower the link overhead. The retransmission overhead is information about the probability that a data packet sent by a node on a link to another node needs to be retransmitted to ensure that the data packet can be successfully transmitted. The retransmission overhead represents a success rate of data transmission by a node on a link. When the same data packet is transmitted, the higher the success rate of transmitting the data packet for the first time, the lower the node's retransmission overheads.

In step S103, the performance of the real-time route and the historical route are evaluated based on the link overheads and the retransmission overheads. Specifically, the data transmission performance of the real-time route and the historical route is evaluated based on the two dimensions of link overheads and retransmission overheads, so as to determine the best route from the source node to the current node so far; and as the route request packet is broadcast, the destination node and each intermediate node previous to the destination node determine the best route from the source node to the current node so far. Finally, the final route request packet is broadcast to the destination node, and each time the destination node receives the route request packet, the destination node evaluates the data transmission performance of the real-time route and the historical route to determine the best route from the source node to the destination node. The best route from the source node to the current node is determined based on the link overheads and the retransmission overheads, and a priority of the route performance evaluation based on the link overheads is higher than a priority of the route performance evaluation based on the retransmission overheads. In other words, both the link overheads of the real-time route and the link overheads of the historical route are first evaluated, and the route with link overheads that meet a preset condition is selected as the best route; and when both the link overheads of the real-time route and the link overheads of the historical route meet the preset condition, the real-time route and historical route are evaluated based on the dimension of retransmission overheads to obtain a final evaluation result.

Step S104: If the evaluation result indicates that the real-time route is better than the historical route, update a reverse route of the current node based the real-time route, so as to discover a route between the source node and the destination node based on the updated reverse route of the current node.

In step S104, if the evaluation result indicates that the real-time route is better than the historical route, that is, the real-time route is the best route from the source node to the current node so far, the reverse route of the current node is updated based on the real-time route, and the reverse route is maintained for a period of time; when the route request packet reaches the destination node, the destination node sends, through unicast, the route response packet to the source node through the best route established by each intermediate node; and when the source node receives the route response packet, the best route from the source node to the destination node so far can be determined based on a transmission path of the route response packet.

According to step S101 to step S104 described in this embodiment of this application, when it is not the first time that the current node does not receive a route request packet from the source node to the destination node, the real-time route and historical route from the source node to the current node are evaluated from the two dimensions of link overheads and retransmission overheads to determine the best route from the source node to the current node so far, and then when the real-time route is better than the historical route according to the evaluation result, the reverse route of the current node is updated according to the real-time route until the route request packet is broadcast to the destination node. The destination node and each intermediate node previous to the destination node determine the best route from the source node to the current node, so that the performance of the link overhead and retransmission overhead on each link using the route from the source node to the destination node is more balanced, and the forward and reverse transmission performance is more balanced.

Figure 2:
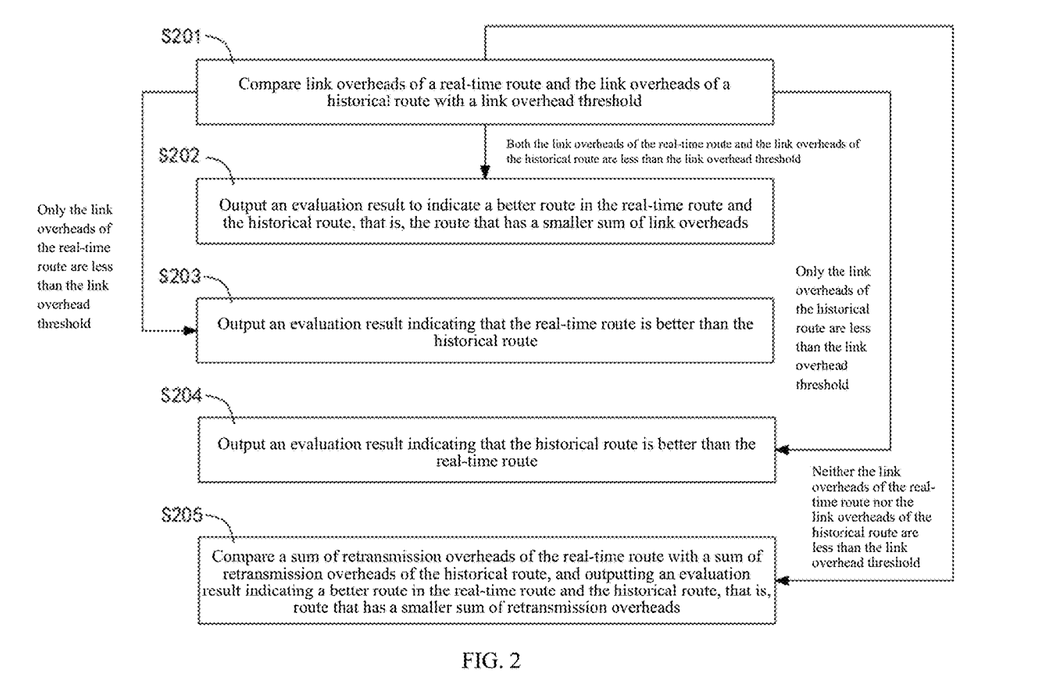
FIG. 2 is a flowchart of a specific method of step S103 according to an embodiment of this application.

As shown in FIG. 2, in some embodiments, step S103 may specifically include, but is not limited to, step S201 to step S205. The following describes the five steps in detail with reference to FIG. 2.

Step S201: Compare the link overheads of the real-time route and the link overheads of the historical route with a link overhead threshold.

If both the link overheads of the real-time route and the link overheads of the historical route are less than the link overhead threshold, perform step S202. If only the link overheads of the real-time route are less than the link overhead threshold, perform step S203. If only the link overheads of the historical route are less than the link overhead threshold, perform step S204. If neither the link overheads of the real-time route nor the link overheads of the historical route are less than the link overhead threshold, perform step S205.

Step S202: Output an evaluation result indicating a better route in the real-time route and the historical route, that is, the route that has a smaller sum of link overheads.

Step S203: Output an evaluation result indicating that the real-time route is better than the historical route.

Step S204: Output an evaluation result indicating that the historical route is better than the real-time route.

Step S205: Compare a sum of retransmission overheads of the real-time route with a sum of retransmission overheads of the historical route, and outputting an evaluation result indicating a better route in the real-time route and the historical route, that is, route that has a smaller sum of retransmission overheads.

In this embodiment, the performance of the real-time route and the historical route is evaluated based on based on the link overheads and the retransmission overheads. Specifically, the link overheads of the real-time route and the link overheads of the historical route are compared with the preset link overhead threshold to determine whether the link overheads of the real-time route are less than the link overhead threshold, and whether the link overheads of the historical route are less than the link overhead threshold. If both the link overheads of the real-time route and the link overheads of the historical route are less than the link overhead threshold, the real-time route and the historical route have the same performance in the dimension of link overheads, and the performance in the dimension of link overheads is good; and based on this, a sum of link overheads of the real-time route and a sum of link overheads of the historical route are compared, and an evaluation result indicating a better route in the real-time route and the historical route (that is, the route that has a smaller sum of link overheads) is output. If the link overheads of the real-time route are less than the link overhead threshold but the link overheads of the historical route are not less than the link overhead threshold, the performance of the real-time route is better than the performance of the historical route in the dimension of link overheads, and an evaluation result indicating that the real-time route is better than the historical route is output. If the link overheads of the real-time route are not less than the link overhead threshold but the link overheads of the historical route are less than the link overhead threshold, the performance of the historical route is better than the performance of the real-time route in the dimension of link overheads, and an evaluation result indicating that the historical route is better than the real-time route is output. If neither the link overheads of the real-time route nor the link overheads of the historical route are less than the link overhead threshold, the real-time route and the historical route have the same performance in the dimension of link overhead, and the performance in the dimension of link overhead is poor; and based on this, a sum of retransmission overheads of the real-time route and a sum of retransmission overheads of the historical route are compared, and an evaluation result indicating a better route in the real-time route and the historical route (that is, the route that has a smaller sum of retransmission overheads) is output.

It may be understood that channel occupation duration, a hop count, the link overhead, and the retransmission overhead are all dimensions that can be used to evaluate the routing transmission performance. For two routes with the same source node and the same destination node, the technical solution provided in the embodiment of this application is to evaluate the data transmission performance based on the two dimensions of link overheads and retransmission overheads, and a priority of the route performance evaluation based on the link overheads is higher than a priority of the route performance evaluation based on the retransmission overheads. When the link overheads of each route meet a preset condition, data transmission performance is evaluated based on a sum of link overheads of each route, and an evaluation result indicating a better route (that is, the route that has a smaller sum of link overheads) is output. A sum of link overheads of a route with fewer hops is usually less than a sum of link overheads of a route with more hops. However, when the sum of link overheads of the route with fewer hops is greater than the sum of link overheads of the route with more hops, the evaluation result is still that the route with the smaller sum of link overheads in the two routes is better than the other route. Similarly, a sum of link overheads of a route with shorter channel occupation duration is usually less than a sum of link overheads of a route with longer channel occupation duration. However, when the sum of link overheads of the route with shorter channel occupation duration is greater than the sum of link overheads of the route with longer channel occupation duration, the evaluation result is still that the route with the smaller sum of link overheads in the two routes is better than the other route. In some embodiments, before S201, the method further includes:

performing fuzzing on a power loss of a link and transmitting and receiving performance parameters of the link according to a preset fuzzing rule to obtain the link overheads, and performing fuzzing on a retransmission probability value of the link to obtain the retransmission overheads.

Specifically, after fuzzing is performed on the power loss of the link and the transmitting and receiving performance parameters of the link, the link overheads of seven link overhead levels are obtained; and after fuzzing is performed on the retransmission probability value of the link, the retransmission overheads of three retransmission overhead levels are obtained. When the comprehensive evaluation value of the power loss of the link and the transmitting and receiving performance parameters of the link is within the link overhead value range corresponding to a link overhead level, the power loss value belongs to the link overhead level; and when the retransmission probability value is within the range of the retransmission probability value corresponding to a retransmission overhead level, the retransmission probability value belongs to the retransmission overhead level. In this way, the link overheads and the retransmission overheads are obtained. When a node receives a route request packet for the first time, the node writes the obtained link overheads and retransmission overheads into the route request packet, and another node that receives the route request packet performs a test of sending and receiving data packets with the node that broadcasts the route request packet to determine link overheads and retransmission overheads between the two nodes, and then determines link overheads and retransmission overheads of a route from the source node to the current node by combining the link overheads and the retransmission overheads in the route request packet. The route request packet further includes a maximum-hop-count threshold. For example, if the source node sets the maximum-hop-count threshold to 12 hops and an area radius is 12, the area radius is reduced by 1 each time the route request packet is broadcast, and the destination node can determine a quantity of hops based on the latest value of the area radius when the destination node receives the route request packet.

Figure 3:
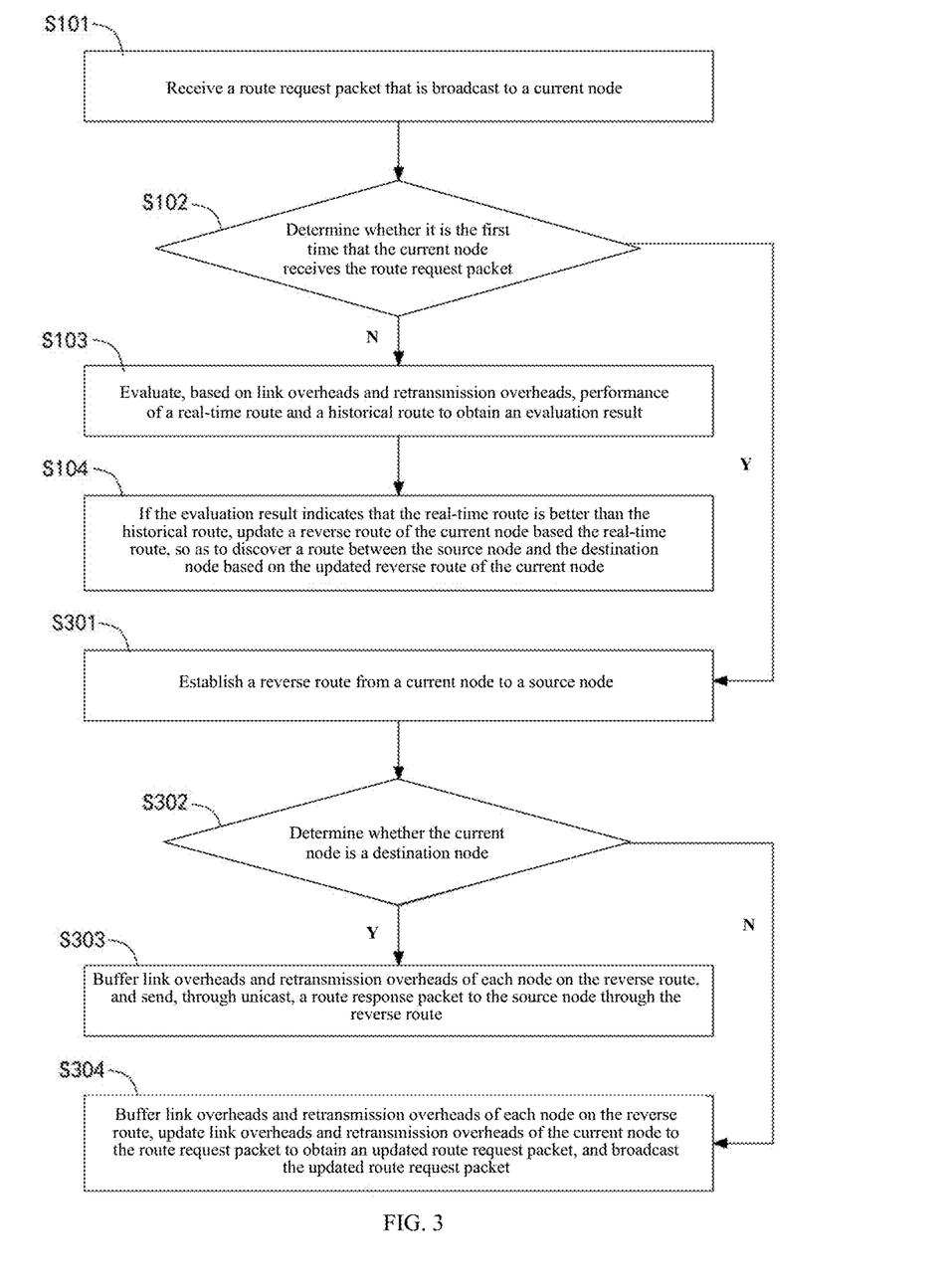
FIG. 3 is a second optional flowchart of a route discovery method according to an embodiment of this application.

Referring to FIG. 3, FIG. 3 is a second optional flowchart of a route discovery method according to an embodiment of this application. Based on the embodiment shown in FIG. 1, the method in FIG. 3 may specifically include, but is not limited to, step S301 to step S304. The following describes the four steps in detail with reference to FIG. 3.

If the determining result in step S102 is that the route request packet is received for the first time, perform step S301.

Step S301: Establish a reverse route from a current node to a source node.

Step S302: Determine whether the current node is a destination node.

If the current node is the destination node, perform step S303; or if the current node is not the destination node, perform step S304.

Step S303: Buffer link overheads and retransmission overheads of each node on the reverse route, and send, through unicast, a route response packet to the source node through the reverse route.

Step S304: Buffer link overheads and retransmission overheads of each node on the reverse route, update link overheads and retransmission overheads of the current node to the route request packet to obtain an updated route request packet, and broadcast the updated route request packet.

In this embodiment, when the current node receives the route request packet for the first time, the current node establishes the reverse route from the current node to the source node. If the current node is the destination node, the route response packet is sent, through unicast, to the source node through the reverse route of the destination node to establish a route from the source node to the destination node. If the current node is not the destination node, the link overheads and retransmission overheads used for sending and receiving data packets between the current node and the node that broadcasts the route request packet to the current node are tested, the obtained link overheads and retransmission overheads are updated to the route request packet to obtain an updated route request packet, and the updated route request packet is broadcast to a neighbor node of the current node. When an intermediate node and the destination node receive the route request packet, the link overheads and retransmission overheads of each node on the reverse route are buffered, so as to evaluate the performance of the real-time route and the historical route when the route request packet is received again.

In some embodiments, step S301 specifically includes:

recording node information of a broadcast node, sending, through unicast, the route response packet to the broadcast node before preset duration expires, and deleting the node information of the broadcast node when the preset duration expires, where the broadcast node is a node that broadcasts the route request packet to the current node.

Specifically, when the current node receives the route request packet broadcast by the broadcast node, the current node records the node information of the broadcast node to establish a reverse route from the current node to the source node; the reverse route of the current node is saved for a sufficient preset period of time to ensure that the route request packet can be broadcast to the destination node and that the route response packet that is sent, through unicast, by the destination node can be received; and when the preset duration expires, the current node deletes the node information of the broadcast node, in which case the route response packet has been sent, through unicast, to the source node.

In some embodiments, after step S301, the method further includes:

receiving the route response packet that is sent, through unicast, to the current node; and establishing a forward route from the current node destination node based on the route response packet received by the current node.

Specifically, the destination node sends, through unicast, the route response packet to the source node through the reverse route established by each intermediate node; and when the current node receives the route response packet that is sent, through unicast, by the current node, the current node establishes a forward route from the current node to the destination node as instructed by the route response packet, so as to determine a node to which the current node needs to send, through unicast, a data packet when the source node transmits the data packet to the destination node. When the current node receives the route response packet, the current node records the node that sends, through unicast, the route response packet to the current node, and then writes the node information of the node into the routing table of the current node; and each node performs the foregoing operations when receiving the route response packet until the source node receives the route response packet, so that a route discovery process is completed and then the source node can start data transmission with the destination node.

In some embodiments, step S304 specifically includes:

updating a routing table of the current node based on the real-time route;

updating the reverse route of the current node based on the routing table of the current node; and sending, through unicast, a route response packet of the destination node to a neighbor node of the current node through the reverse route of the current node, so that the route response packet is finally transmitted to the source node.

Specifically, when it is found that the real-time route is better than the historical route, the node information of the node included in the real-time route is written into the routing table of the current node to update the routing table of the current node. In this way, if the current node is the destination node, the received route response packet is sent, through unicast, directly through the updated reverse route of the destination node; or if the current node is an intermediate node, when the current node receives the route response packet that is sent, through unicast, by the destination node through the reverse route of the destination node, the current node sends, through unicast, the route response packet through the updated reverse route of the current node. After sending, through unicast, the route response packet, each node updates a route from the current node to the destination node until the route response packet reaches the source node, and the source node can determine the route from the source node to the destination node based on the route established by each intermediate node to the destination node.

Figure 4:
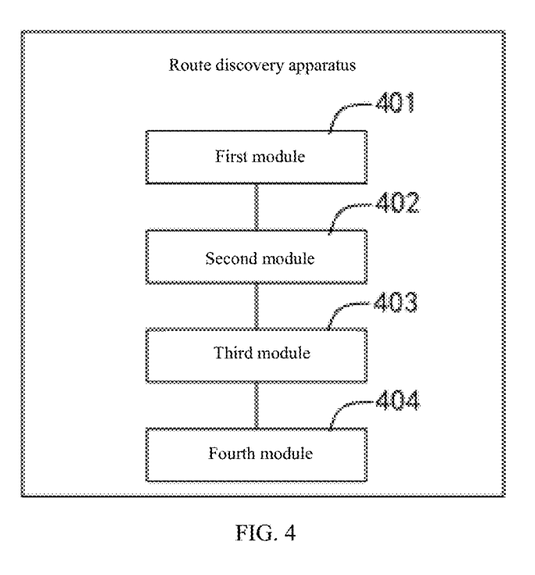
FIG. 4 is an optional schematic diagram of a structure of a route discovery apparatus according to an embodiment of this application.

Referring to FIG. 4, an embodiment of this application further provides a route discovery apparatus, which can implement the foregoing route discovery method. The apparatus includes:

a first module 401, configured to receive a route request packet that is broadcast to a current node;

a second module 402, configured to determine whether it is the first time that the current node receives the route request packet;

a third module 403, configured to: if it is not the first time that the current node receives the route request packet, evaluate, based on link overheads and retransmission overheads, performance of a real-time route and a historical route to obtain an evaluation result, where the real-time route is a route through which the route request packet is broadcast to the current node, the historical route is a route through which the route request packet is broadcast to the current node, and a priority of the route performance evaluation based on the link overheads is higher than a priority of the route performance evaluation based on the retransmission overheads; and a fourth module 404, configured to: if the evaluation result indicates that the real-time route is better than the historical route, update a reverse route of the current node based on the real-time route, so as to discover a route between a source node and a destination node based on the updated reverse route of the current node.

A specific implementation of the route discovery apparatus is basically the same as the specific embodiment of the route discovery method, and will not be repeated here.

Figure 5:
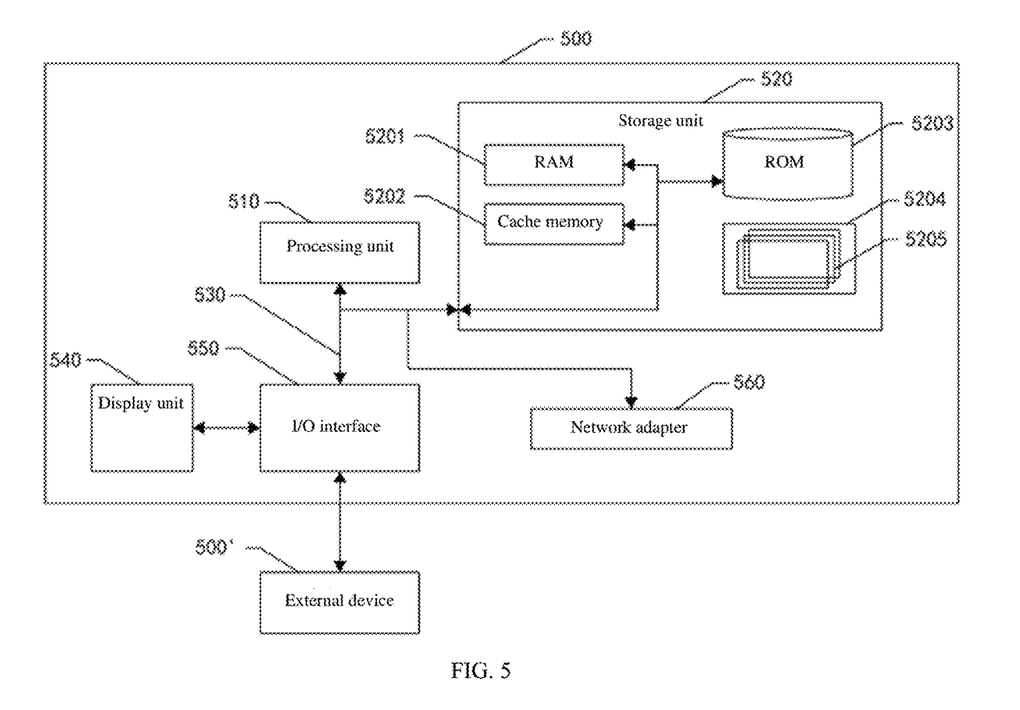
FIG. 5 is a schematic diagram of a structure of an electronic device according to an embodiment of this application.

FIG. 5 is a block diagram of an electronic device according to an example embodiment.

The following describes the electronic device 500 according to this embodiment of the present disclosure with reference to FIG. 5. The electronic device 500 shown in FIG. 5 is merely an example, and should bring no limitation on the function and usage scope of the embodiments of the present disclosure.

As shown in FIG. 5, the electronic device 500 is represented in a form of a general purpose computing device. Components of the electronic device 500 may include, but are not limited to: at least one processing unit 510, at least one storage unit 520, a bus 530 connecting different system components (including the storage unit 520 and the processing unit 510), a display unit 540, and the like.

The storage unit stores program code, and the program code may be executed by the processing unit 510, so that the processing unit 510 to perform the steps described in the route discovery method section described above according to various example embodiments of the present disclosure.

The storage unit 520 may include a readable medium in a form of a volatile storage unit, such as a random access memory (RAM) unit 5201 and/or a cache memory unit 5202, and may further include a read-only memory (ROM) unit 5203.

The storage unit 520 may further include a program/utility 5204 having a set of (or at least one) program module 5205. The program module 5205 includes, but is not limited to, an operating system, one or more application programs, other program modules, and program data, and each or a combination of these examples may include an implementation of a network environment.

The bus 530 may represent one or more of several types of bus architectures, including a storage unit bus or a storage unit controller, a peripheral bus, an accelerated graphics port, a processing unit, or a local area bus that uses any one of the bus architectures in a variety of bus architectures.

The electronic device 500 may also communicate with one or more external devices 500' (for example, a keyboard, a pointing device, and a Bluetooth device), and may also communicate with on one or more devices enabling a user to interact with the electronic device 500, and/or communicate with any device (for example, a router or a modem) enabling the electronic device 500 to communicate with one or more other computing devices. The communication may take place through an input/output (I/O) interface 550. In addition, the electronic device 500 may also communicate with one or more networks (for example, a local area network (LAN) or a wide area network (WAN) and/or a public network, for example, the Internet) through a network adapter 560. The network adapter 560 may communicate with other modules of the electronic device 500 through the bus 530. It should be understood that although not shown in the figure, other hardware and/or software modules that may be used in combination with the electronic device 500 include, but are not limited to, microcode, device drivers, redundant processing units, external disk drive arrays, RAID systems, tape drives, and data backup storage systems.

An embodiment of this application further provides a computer-readable storage medium. The computer-readable storage medium stores a computer program. When the computer program is executed by a processor, the foregoing route discovery method is implemented.

According to the route discovery method and apparatus, the device, and the storage medium provided in the embodiments of this application, when it is not the first time that the current node does not receive a route request packet from the source node to the destination node, the real-time route and historical route from the source node to the current node are evaluated from the two dimensions of link overheads and retransmission overheads to determine the best route from the source node to the current node so far, and then when the real-time route is better than the historical route according to the evaluation result, the reverse route of the current node is updated according to the real-time route until the route request packet is broadcast to the destination node. The destination node and each intermediate node previous to the destination node determine the best route from the source node to the current node, so that the performance of the link overhead and retransmission overhead on each link using the route from the source node to the destination node is more balanced, and the forward and reverse transmission performance is more balanced.

Through the description of the foregoing embodiments, it is easy for a person skilled in the art to understand that the example embodiments described here can be implemented by software or by combining software with necessary hardware. Therefore, the technical solutions according to the embodiments of the present disclosure may be embodied in a form of a software product, and the software product may be stored in a non-volatile storage medium (which may be a CD-ROM, a USB flash drive, a removable hard disk, or the like) or on a network, and includes several instructions for instructing a computing device (which may be a personal computer, a server, a network device, or the like) to perform the methods according to the embodiments of the present disclosure.

The program product may use one readable medium or any combination of more than one readable medium. The readable medium may be a readable signal medium or a readable storage medium. For example, the readable storage medium may be, but is not limited to, an electrical, a magnetic, an optical, an electromagnetic, an infrared, or a semiconductor system, apparatus or device, or any combination thereof. More specific examples (non-exhaustive list) of the readable storage medium include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage component, a magnetic storage component, or any appropriate combination thereof.

The computer-readable storage medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable storage medium may alternatively be any readable medium other than the readable storage medium. The readable medium may send, propagate, or transmit a program used by or in combination with an instruction execution system, apparatus, or device. The program code included in the readable storage medium may be transmitted by using any appropriate medium, including but not limited to a wireless medium, a wired medium, an optical cable, RF, or any appropriate combination thereof.

The program code used to perform the operations of the present disclosure may be written in any combination of one or more program design languages. The program design languages include object-oriented program design languages such as Java and C++, and further include a conventional procedural program design language such as a "C" language or a similar program design language. The program code may be completely executed on a computing device of a user, partially executed on a user device, executed as an independent software package, partially executed on a computing device of a user and partially executed on a remote computing device, or completely executed on a remote computing device or server. When a remote computing device is involved, the remote computing device may be connected to a user's computing device by using any type of network, including a local area network (LAN) or a wide area network (WAN), or may be connected to an external computing device (for example, connected by using an Internet service provider through the Internet).

A person skilled in the art may understand that the foregoing modules may be distributed in the apparatuses according to the description of the embodiments, or may be changed accordingly in one or more apparatuses that are uniquely different from the embodiment. The modules of the foregoing embodiments may be combined into a module, or may be split into a plurality of submodules.

Through the description of the foregoing embodiments, it is easy for a person skilled in the art to understand that the example embodiments described here can be implemented by software or by combining software with necessary hardware. Therefore, the technical solutions according to the embodiments of the present disclosure may be embodied in a form of a software product, and the software product may be stored in a non-volatile storage medium (which may be a CD-ROM, a USB flash drive, a removable hard disk, or the like) or on a network, and includes several instructions for instructing a computing device (which may be a personal computer, a server, a network device, or the like) to perform the methods according to the embodiments of the present disclosure.

Example embodiments of the present disclosure are specifically shown and described above. It should be understood that the present disclosure is not limited to the detailed structure, arrangement manner, or implementation described here; and instead, the present disclosure is intended to cover various modifications and equivalent arrangements in the spirit and scope of the appended claims.

What is claimed is:

1. A route discovery method, comprising:
receiving a route request packet that is broadcast to a current node;
determining whether it is the first time that the current node receives the route request packet;
if it is not the first time that the current node receives the route request packet, evaluating, based on link overheads and retransmission overheads, performance of a real-time route and a historical route to obtain an evaluation result, wherein the real-time route is a route through which the route request packet is broadcast to the current node, the historical route is a route through which the route request packet is broadcast to the current node, and a priority of the route performance evaluation based on the link overheads is higher than a priority of the route performance evaluation based on the retransmission overheads; and
if the evaluation result indicates that the real-time route is better than the historical route, updating a reverse route of the current node based on the real-time route, so as to discover a route between a source node and a destination node based on the updated reverse route of the current node;
wherein the evaluating, based on link overheads and retransmission overheads, performance of a real-time route and a historical route to obtain an evaluation result comprises:
comparing the link overheads of the real-time route and the link overheads of the historical route with a link overhead threshold;
if both the link overheads of the real-time route and the link overheads of the historical route are less than the link overhead threshold, outputting an evaluation result indicating a better route in the real-time route and the historical route, that is, the route that has a smaller sum of link overheads;
if only the link overheads of the real-time route are less than the link overhead threshold, outputting an evaluation result indicating that the real-time route is better than the historical route;
if only the link overheads of the historical route are less than the link overhead threshold, outputting an evaluation result indicating that the historical route is better than the real-time route; and
if neither the link overheads of the real-time route nor the link overheads of the historical route are less than the link overhead threshold, comparing a sum of retransmission overheads of the real-time route with a sum of retransmission overheads of the historical route, and outputting an evaluation result indicating a better route in the real-time route and the historical route, that is, the route that has a smaller sum of retransmission overheads;
wherein the route discovery method further comprises:
if it is the first time that the current node receives the route request packet, establishing a reverse route from the current node to the source node;
determining whether the current node is the destination node;
if the current node is the destination node, buffering link overheads and retransmission overheads of each node on the reverse route, and sending, through unicast, a route response packet to the source node through the reverse route; and
if the current node is not the destination node, buffering link overheads and retransmission overheads of each node on the reverse route, updating link overheads and retransmission overheads of the current node to the route request packet to obtain an updated route request packet, and broadcasting the updated route request packet;
wherein the establishing the reverse route from the current node to the source node comprises:
recording node information of a broadcast node, sending, through unicast, the route response packet to the broadcast node before preset duration expires, and deleting the node information of the broadcast node when the preset duration expires, wherein the broadcast node is a node that broadcasts the route request packet to the current node.

2. The route discovery method according to claim 1, wherein after the updating link overheads and retransmission overheads of the current node to the route request packet to obtain an updated route request packet, and broadcasting the updated route request packet, the method further comprises:
receiving the route response packet that is sent, through unicast, to the current node; and
establishing a forward route from the current node to the destination node based on the route response packet received by the current node.

3. The route discovery method according to claim 1, wherein the updating a reverse route of the current node based on the real-time route, so as to discover a route between a source node and a destination node based on the updated reverse route of the current node comprises:
updating a routing table of the current node based on the real-time route;
updating the reverse route of the current node based on the routing table of the current node; and
sending, through unicast, a route response packet of the destination node to a neighbor node of the current node through the reverse route of the current node, so that the route response packet is finally transmitted to the source node.

4. An electronic device, wherein the electronic device comprises a memory and a processor, the memory stores a computer program, and when the processor executes the computer program, the route discovery method according to claim 1 is implemented.

5. A non-transitory computer-readable storage medium, wherein the computer-readable storage medium stores a computer program, and when the computer program is executed by a processor, the route discovery method according to claim 1 is implemented.

* * * * *